(12) United States Patent
Matthews et al.

(10) Patent No.: US 6,704,493 B1
(45) Date of Patent: Mar. 9, 2004

(54) MULTIPLE SOURCE RECORDING

(75) Inventors: Ian Charles Matthews, San Diego, CA (US); David Alan Desch, Poway, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/519,799

(22) Filed: Mar. 6, 2000

(51) Int. Cl.[7] .................................................. H04N 5/52
(52) U.S. Cl. ...................................... 386/98; 386/124
(58) Field of Search ................................ 386/1, 33, 98, 386/111, 112, 46, 95, 124; 348/423.1, 446, 14.08; 370/474, 535, 536

(56) References Cited

U.S. PATENT DOCUMENTS

| | | | | |
|---|---|---|---|---|
| 5,394,249 A | * | 2/1995 | Shimoda et al. | 386/124 |
| 5,610,661 A | * | 3/1997 | Bhatt | 348/446 |
| 5,864,649 A | * | 1/1999 | Shima | 386/124 |
| 6,049,694 A | * | 4/2000 | Kassatly | 348/14.08 |
| 6,233,389 B1 | * | 5/2001 | Barton et al. | 386/46 |
| 6,504,996 B1 | * | 1/2003 | Na et al. | 386/46 |

* cited by examiner

*Primary Examiner*—Thai Tran
*Assistant Examiner*—Christopher Onuaku
(74) *Attorney, Agent, or Firm*—Mayer Fortkort & Williams, PC; Karin L. Williams, Esq.

(57) ABSTRACT

A system and method are disclosed that accepts different types of signals from multiple sources and routes the signals to the appropriate devices for conversion or other processing so that each signal is in a common or desired format, such as the MPEG standard. The individual signal streams are packetized so that each signal stream carries identifying information associated with it originating signal source and then multiplexed onto a single digital transport stream for storage. Such a system allows overlapping signals of different types from multiple sources to be processed and stored in a single storage device. Each of the signals can then be subsequently retrieved for playback or display.

5 Claims, 1 Drawing Sheet

US 6,704,493 B1

MULTIPLE SOURCE RECORDING

BACKGROUND

1. Field of the Invention

This invention relates to recording and storing signals and, in particular, to recording and storing signals from multiple sources.

2. Description of Related Art

Currently, there exists a large number of analog and digital signals available for home use. Analog signals include conventional television signals that are typically sent directly to a home television receiver via cable, satellite, or terrestrial transmissions using analog standards such as NTSC, PAL, and SECAM. Other analog signals include RF signals, audio signals, and data streams. More recently, signals (both video and audio) are also being transmitted digitally, which have been encoded according to the MPEG (Moving Pictures Experts Group) standard.

Home networking allows these signals from multiple sources to be connected to and output from a single source, such as a television (monitor and speakers), so that consumers can receive a variety of entertainment and information on their television sets. However, not all signals are standardized in a common format, i.e., they are transmitted with different formats, thereby requiring different types of receivers or devices to receive and process the various signals to an appropriate output format. These devices can include set-top boxes (STBs), video cassette recorders (VCRs), satellite dishes, and cable boxes for receiving signals from transmission methods such as direct satellite service (DSS), microwave broadcast, cellular television ("wireless cable"), and television delivered via digital telephone phone lines. Further, as home television systems become more advanced and the number of signal sources that such systems can receive increases, situations may arise where signals from two or more sources are desired during simultaneous or overlapping time periods.

In these cases, different recording and storage devices are required for each signal source. For example, an analog video cassette recorder (VCR) can be used for recording analog video/audio signals, a tape, CD, MD, or solid state memory can be used for storing analog/digital audio and data, and a memory card and hard disk drive (HDD) can be used for storing and retrieving digital video, audio, and data. Thus, separate and differently formatted recording devices are needed to store and record one or more of the different signals simultaneously for later retrieval. As the number of different signal sources continues to increase, the number of separate recording and storage devices will also increase, thereby increasing both the size and cost of the home networking system.

Therefore, it is desirable to provide a system for simultaneously recording and storing signals from multiple sources that overcomes the disadvantages discussed above associated with conventional systems.

SUMMARY

In accordance with an aspect of the invention, a system and method are provided which allows simultaneous signals from various sources to be processed and stored for later retrieval and playback. Analog signals and digital signals of various formats are input to a source interface. The source interface routes selected signals, via a selector device such as a remote control, to appropriate devices for processing. Analog signals are routed to an analog tuner/demodulator to demodulate the RF signals down to IF signals. The IF signals are then transmitted to a decoder for converting the IF signals to a common analog format, such as NTSC, PAL, RGB, or YUV. The analog signals are then digitized using an analog-to-digital converter. The sampling rate or frequency can be selected by the user or automatically selected based on the quality of the analog signals and the quality of the output display device. Once the analog signals have been converted to digital signals, the digital signals are sent to an encoder for time-compression (e.g., MPEG encoding) to reduce the bit rates. After encoding, the digital signals are stored in a buffer.

Digital signals already in the desired format (e.g., MPEG) are routed to a demultiplexer to separate the digital stream into individual data streams, such as video and audio. These digital streams are also stored in the buffer. Digital signals in a format different than the desired format are first converted to the desired format by a converter before being transmitted to the buffer. Once all the signals from the various sources are in a common desired digital format (e.g., MPEG), the signal streams are sent to a packetizer for processing each signal stream into packets for identification and later retrieval. Once the signals have been packetized, they are sent to a formatter, which multiplexes the signals onto a single digital transport stream. The transport stream can then be stored in a digital storage device to be accessed at a later time. Thus, signals transmitted simultaneously or during overlapping time periods from different sources can be stored and retrieved by accessing specific packets within the stored transport stream. This eliminates the need for multiple decoders to receive and decode the incoming information.

The present invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with the present invention, selected analog signals from analog sources are demodulated, decoded to a common analog format, and digitized and compressed to a desired digital format suitable for processing by an output device. Selected digital signals that are in the desired digital format are demultiplexed to separate signal components (e.g., audio and video components) from the digital signal stream. Other digital signals not in the desired digital format are first converted to the desired digital format. The resulting digital data streams are then packetized and combined into a single data digital transport stream for storage and later retrieval. As a result, signals of different formats from different sources can be simultaneously recorded and accessed for subsequent use.

Figure 1:
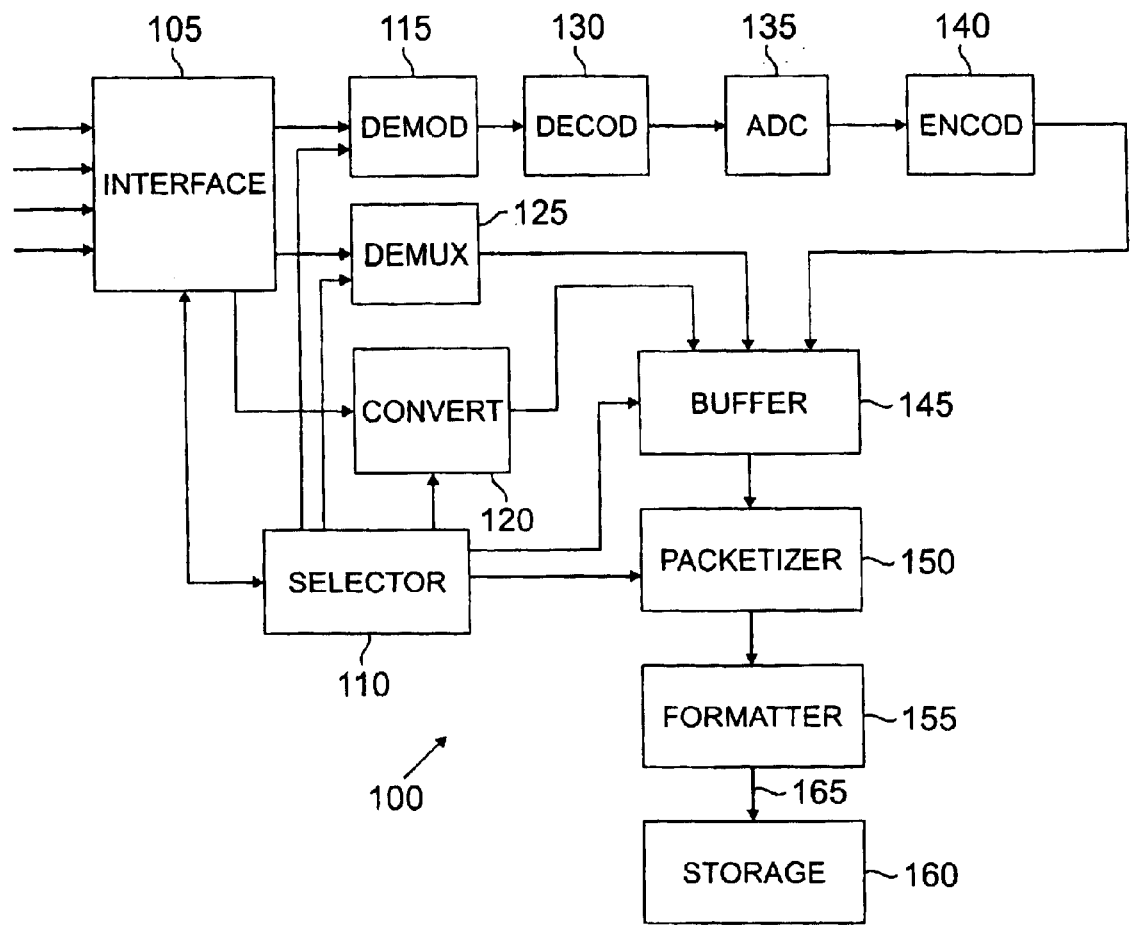
FIG. 1 is a block diagram of a system for recording multiple signal sources according to one embodiment of the present invention.

FIG. 1 shows a block diagram of a system 100 according to one embodiment of the invention. System 100 includes a source interface 105, a source selector 110 coupled to source interface 105, an analog demodulator/tuner 115, a digital converter 120, and a demultiplexer 125 each coupled to source interface 105 and source selector 110, a decoder 130 coupled to demodulator 115, an analog to digital converter (ADC) 135 coupled to decoder 130, a digital compression circuit or encoder 140 coupled to ADC 135, a buffer 145 coupled to source selector 110, digital converter 120, demultiplexer 125, and encoder 140, a packetizer 150 coupled to source selector 110 and buffer 145, a stream formatter 155 coupled to packetizer 145, and a digital storage 160 coupled to formatter 155.

Source interface 105 accepts signals from multiple sources, e.g., analog video signals such as NTSC, PAL, and SECAM signals from VCRs, satellite receivers, set-top boxes, cable boxes, and coaxial cables, analog audio and data signals from tuners and telephone lines, digital video and audio signals such as MPEG, MPEG-2, and DirecTV™ signals from digital television sources, and digital data signals. Other inputs to source interface 105 can include demodulated inputs for analog video/audio data via phono connectors or multi S-terminals. Regardless of the signal source, the signals input to source interface 105 have identifiers that allow source interface 105 to select and route specific signals to desired destinations.

Source selector 110 selects which ones of the signals input to source interface 105 are to be recorded, based on either user supplied inputs or predefined selection criteria. For example, source selector 110 could be a remote controller, in which the user selects the sources, the particular channel for each source, the start and end time of each channel to be recorded, and any other suitable information. Source selector 110 can also select signals based on previous history, such as pre-selected favorites. In addition to selecting signals, source selector 110 also provides information or data to other blocks, such as sampling rate for analog-to-digital conversion and insertion of additional data, such as title, time, and/or source associated with the signal.

Once the desired analog and/or digital signals are selected, and at the appropriate time(s), the signals are routed by source interface 105 to demodulator 115, digital converter 120, and/or demultiplexer 125, depending on the type of signal. Analog signals are sent to analog demodulator/tuner 115 to recover original information from the signal. Demodulator 115 demodulates the RF analog signal down to an IF signal for input to decoder 130. The IF signal is then decoded to a common analog format, e.g., from a composite analog signal format such as NTSC or PAL to a component analog signal format such as RGB (Red, Green, Blue) or YUV (luminance signal (Y) and two color difference signals R-Y (U) and B-Y (V)), by decoder 130. Decoder 130 is an analog decoder and can be a multi-standard device for NTSC/PAL or separate for SECAM. At this point, all the selected analog input signals are in a common analog format.

ADC 135 then samples and converts each of the analog signals to a digital signal. For example, ADC 135 can be a standard 8 to 10 bit analog-to-digital converter, which can have a variable sampling frequency or rate, depending on the original signal source quality and the desired output quality. The length (or time) of content stored is directly proportional to the number of samples (or frequency). For example, if the source is standard NTSC, sampling the analog signal above approximately 4 to 5 MHz would be impractical since the quality of the original signal is below that indicated by the sampling rate. Similarly, if the display or signal output device is not capable of displaying a high quality signal, such as a High Definition signal for HDTV, then sampling the analog signal at an accordingly high data rate would be impractical as the resulting high quality data signal could not be adequately displayed on the output device. In some embodiments, the sampling frequency is automatically selected based on the type of signal source and output device. In other embodiments, the sampling frequency can be manually selected by the user so that the user can choose between trade-offs of time and quality. For example, a high quality signal might typically be represented by 12 bits (8Y:4U:4V), but a user may select a sampling rate so that the signal is represented by 6 bits (4Y:1U:1V). This results in a lower quality output signal, but allows for longer recording times, similar to the differences between an SP and an LP (or SLP) recording mode.

After conversion to a digital signal, encoder 140 time compresses the digital signals to reduce the bit rates, e.g., according to the MPEG standard, MPEG-2, or other suitable standard. The resulting MPEG stream is then transmitted to buffer 145.

Digital signals that are already in the desired format, e.g., MPEG standard, and have multiple signal components, such as audio and video, are routed to demultiplexer 125 from source interface 105. Demultiplexer 125 separates the digital MPEG signal into individual data streams, e.g., audio and data streams. The MPEG signal contains several channels, which contain information to demultiplex the MPEG stream. Selector 110 accesses information from the MPEG signal, as is known in the art, such as the parsing of the header to determine the content in the stream. This is then used, via hardware logic or a microprocessor, to select desired channels to enable the signal to be demultiplexed. The demultiplexed digital signal streams are then transmitted to buffer 145.

Digital signals that are not in the same format as signals from encoder 140 and demultiplexer 125 are routed to digital converter 120 for conversion to the appropriate digital format, e.g., MPEG or MPEG-2. The converted signal is then transmitted to buffer 145. Buffer 145 allows a single data stream to be generated from signals arriving from various signal sources and processing devices. Signals arriving from encoder 140, demultiplexer 125, and digital converter 120 can be transmitted to and stored in buffer 145 until the desired signals are all available. Buffer 145 would then transmit the signal to packetizer 150, based on signals from selector 110.

Figure 2:
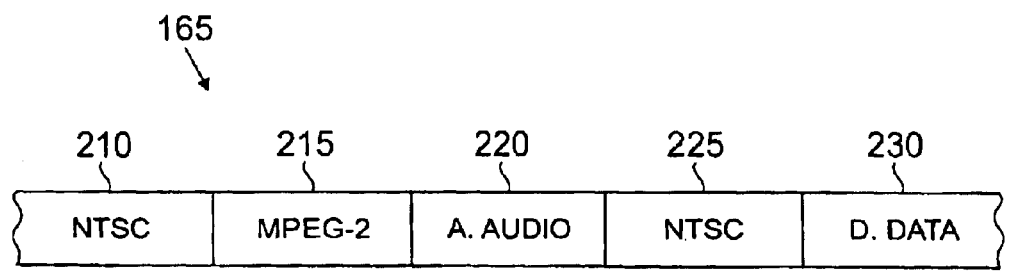
FIG. 2 is an example of a portion of a transport stream of the present invention.

Once all the selected analog and digital signals are in the same digital format, e.g., MPEG encoded, and are ready to be transmitted, packetizer 150 processes each signal stream into packets for identification and later retrieval. For example, each signal stream could include a header having identifying information such as the original source and format (e.g., type, resolution, aspect ratio) of the signal, audio content, and time. Once the signals have been packetized, they are sent to formatter 155, which multiplexes the signals onto a single digital transport stream 165. The transport stream can then be stored in digital storage 160, such as an audio/video tape, a CD, a DVD, a hard disk drive, a memory stick, or a solid state memory device. An example of a portion of a transport stream 165 is shown in FIG. 2. Packets 210, 215, 220, 225, and 230 were input to system 100 as a first analog NTSC signal, a digital MPEG-2 signal, an analog audio signal, a second analog NTSC signal, and a digital data signal, respectively. Thus, if the first NTSC signal, the digital MPEG-2 signal, and the analog audio signal were input to system 100 during overlapping time periods, all three signals can be retrieved by accessing packets 210, 215, and 220 in the stored transport stream 165.

Although the invention has been described with reference to particular embodiments, the description is only an example of the invention's application and should not be taken as a limitation. Consequently, various adaptations and combinations of features of the embodiments disclosed are within the scope of the invention as defined by the following claims.

We claim:

1. A method of recording signals from multiple sources, comprising:

converting a first signal from a first signal source to a desired format, wherein the first signal is an analog signal;

converting a second signal from a second signal source to the desired format, wherein the second signal is a digital signal;

demultiplexing a third signal, having an audio component and a video component, wherein the third signal is in the desired format;

packetizing the first, second and third signals;

multiplexing the first, second and third signals into a single transport stream; and storing the single transport stream.

2. The method of claim 1, further comprising buffering the first the first, second and third signals prior to the packetizing.

3. The method of claim 1, wherein converting the first signal comprises:

demodulating the first signal;

decoding the first signal to a common analog format;

converting the first signal to a digital signal; and encoding the digital signal to the desired format.

4. The method of claim 3, wherein the desired format is an MPEG standard.

5. The method of claim 1, further comprising routing the first and second signals from a single device to selected devices for the converting.

\* \* \* \* \*

UNITED STATES PATENT AND TRADEMARK OFFICE
CERTIFICATE OF CORRECTION

PATENT NO. : 6,704,493 B1
DATED : March 9, 2004
INVENTOR(S) : Ian Charles Matthews et al.

It is certified that error appears in the above-identified patent and that said Letters Patent is hereby corrected as shown below:

Title page,
Item [57], ABSTRACT,
Line 7, before "originating", change "it" to -- its --.

Column 6,
Line 6, after first word "first", delete "the first".

Signed and Sealed this

Twenty-third Day of November, 2004

JON W. DUDAS
*Director of the United States Patent and Trademark Office*